United States Patent
Faccone et al.

(10) Patent No.: US 6,478,841 B1
(45) Date of Patent: Nov. 12, 2002

(54) INTEGRATED MINI-MILL FOR IRON AND STEEL MAKING

(75) Inventors: Dominic M. Faccone, Allegheny County, PA (US); Narayan Govindaswami, Mecklenburg County, NC (US)

(73) Assignee: Techint Technologies Inc., Coraopolis, PA (US)

( * ) Notice: Subject to any disclaimer, the term of this patent is extended or adjusted under 35 U.S.C. 154(b) by 0 days.

(21) Appl. No.: 09/951,370

(22) Filed: Sep. 12, 2001

(51) Int. Cl.[7] .................. C21B 13/12; C21B 13/14
(52) U.S. Cl. ................. 75/10.63; 75/491; 75/496
(58) Field of Search .................. 75/10.63, 491, 75/496

(56) References Cited

U.S. PATENT DOCUMENTS

| | | |
|---|---|---|
| 420,945 A | 2/1890 | Laureau |
| 1,264,832 A | 4/1918 | MacDonald |
| 1,317,553 A | 9/1919 | Clark |
| 1,421,185 A * | 6/1922 | Driscoll .................. 266/173 |
| 1,433,854 A | 10/1922 | Sinding-Larsen |
| 1,588,217 A | 6/1926 | Winkelman |
| 1,775,700 A | 9/1930 | Smith |
| 1,777,993 A | 10/1930 | Coley |
| 1,940,246 A | 12/1933 | Clark et al. ................. 266/8 |
| 2,051,962 A | 8/1936 | Mitchell .................. 266/1 |
| 2,057,554 A | 10/1936 | Bradley .................. 75/91 |
| 2,142,100 A | 1/1939 | Avery .................. 75/35 |
| 2,265,812 A | 12/1941 | Nagel .................. 75/91 |
| 2,368,508 A | 1/1945 | Wile .................. 75/11 |
| 2,577,730 A | 12/1951 | Benedict et al. ............ 75/34 |
| 2,681,854 A | 6/1954 | Kautz .................. 75/38 |
| 2,740,706 A | 4/1956 | Paull et al. .................. 75/35 |
| 2,784,960 A | 3/1957 | Lee .................. 266/24 |
| 2,889,219 A | 6/1959 | Halley .................. 75/52 |
| 2,964,308 A | 12/1960 | Walde .................. 266/9 |
| 2,977,216 A | 3/1961 | Whaley .................. 75/26 |
| 3,033,673 A | 5/1962 | Collin et al. .................. 75/34 |
| 3,082,078 A | 3/1963 | Paull .................. 75/34 |

(List continued on next page.)

FOREIGN PATENT DOCUMENTS

JP  11294969  * 10/1999  ............. C21C/5/28

OTHER PUBLICATIONS

"Hot Transport–Midrex Style", by Gilbert Whitten—pp. 3–9 (Direct from Midrex 3rd Quarter 1998) No month.

Primary Examiner—Roy King
Assistant Examiner—Tima McGuthry Banks
(74) Attorney, Agent, or Firm—Webb Ziesenheim Logsdon Orkin & Hanson, P.C.

(57) ABSTRACT

Disclosed is a method for steel making which includes charging a direct reduction reactor (DRR) with iron ore from a charging system. The iron ore is reduced to hot direct reduced iron (DRI) in the DRR and discharged to rotary kiln(s). The rotary kiln(s) does not process the DRI, but transports the hot DRI to one or more electric arc furnaces (EAF). Top gas (i.e., spent reducing gas) is drawn off of a top section of the DRR. A portion of the top gas is used to pressurize the rotary kiln to prevent air from entering the rotary kiln. Another portion of the top gas flows to a pressure swing adsorber or a vacuum pressure swing adsorber (PSA/VPSA) for $CO_2$ and $H_2O$ removal. A cool reducing gas exits the PSA/VPSA. A plasma torch burns natural gas and oxygen to form a hot reducing gas. The hot reducing gas is mixed with the cool reducing gas to form a final reducing gas. The final reducing gas is delivered to the DRR. Also disclosed is a mini-mill to perform the method of steel making.

7 Claims, 2 Drawing Sheets

U.S. PATENT DOCUMENTS

| | | | |
|---|---|---|---|
| 3,148,050 A | 9/1964 | Von Bogdandy | 75/34 |
| 3,375,099 A | 3/1968 | Marshall | 75/35 |
| 3,539,336 A | 11/1970 | Urich | 75/3 |
| 3,615,351 A | 10/1971 | Happel et al. | 75/38 |
| 3,667,767 A | 6/1972 | Bakewell | 277/95 |
| 3,704,011 A | 11/1972 | Hand et al. | 263/29 |
| 3,764,123 A | 10/1973 | Beggs et al. | 266/29 |
| 3,767,379 A | 10/1973 | Marion | 75/42 |
| 3,776,560 A | 12/1973 | Wentworth, Jr. | 277/88 |
| 3,782,920 A | 1/1974 | Anthes et al. | 75/37 |
| 3,827,584 A | 8/1974 | Grewer et al. | 214/36 |
| 3,880,306 A | 4/1975 | Grewer et al. | 214/152 |
| 3,964,278 A | 6/1976 | Korsch et al. | 68/5 E |
| 3,976,472 A | 8/1976 | Linder | 75/10 R |
| 3,980,128 A | 9/1976 | Stockman | 165/9 |
| 3,980,440 A | 9/1976 | Morse et al | 23/288 M |
| 4,002,465 A | 1/1977 | Brusa | 75/11 |
| 4,005,857 A | 2/1977 | Colautti | 266/191 |
| 4,019,895 A | 4/1977 | Santen | 75/11 |
| 4,040,474 A | 8/1977 | Stroom et al. | 165/9 |
| 4,042,226 A | 8/1977 | Beggs | 266/88 |
| 4,045,214 A | 8/1977 | Wetzel et al. | 75/60 |
| 4,048,091 A | 9/1977 | Barnaba | 252/373 |
| 4,103,903 A | 8/1978 | Capriotti et al. | 277/27 |
| 4,108,636 A | 8/1978 | Lange | 75/35 |
| 4,155,704 A | 5/1979 | Kulabukhov et al. | 432/105 |
| 4,175,951 A | 11/1979 | Rubio | 75/91 |
| 4,193,756 A | 3/1980 | Leon | 432/3 |
| 4,251,267 A | 2/1981 | Beggs et al. | 75/35 |
| 4,252,299 A | 2/1981 | LoBue | 266/44 |
| 4,283,065 A | 8/1981 | Hirao | 277/135 |
| 4,325,731 A | 4/1982 | Becker e al. | 75/91 |
| 4,336,063 A | 6/1982 | Guzmán-Bofill et al. | 75/35 |
| 4,362,554 A | 12/1982 | Santen | 75/11 |
| 4,362,555 A | 12/1982 | Santen et al. | 75/11 |
| 4,367,075 A | 1/1983 | Hartwig | 48/89 |
| 4,375,983 A | 3/1983 | Celada et al. | 75/35 |
| 4,394,021 A | 7/1983 | Merilä | 277/34.3 |
| 4,413,812 A | 11/1983 | Pirklbauer et al. | 266/195 |
| 4,457,520 A | 7/1984 | Grachtrup | 277/85 |
| 4,498,498 A | 2/1985 | Martinez-Vera et al. | 137/613 |
| 4,577,838 A | 3/1986 | Mathiesen | 266/171 |
| 4,606,799 A | 8/1986 | Pirklbauer et al. | 204/170 |
| 4,609,400 A | 9/1986 | Vallomy | 75/46 |
| 4,683,367 A | 7/1987 | Drouet | 219/121 PY |
| 4,790,517 A | 12/1988 | Mathews | 266/156 |
| 4,895,593 A | 1/1990 | Sulzbacher et al. | 75/26 |
| 4,900,356 A | 2/1990 | Hoffman | 75/35 |
| 4,983,214 A | 1/1991 | Bottinelli et al. | 75/387 |
| 5,000,462 A | 3/1991 | Trozzi | 277/12 |
| 5,106,105 A | 4/1992 | Drexler | 277/3 |
| 5,141,208 A | 8/1992 | Foulard | 266/173 |
| 5,192,486 A | 3/1993 | Whipp | 266/156 |
| 5,383,672 A | 1/1995 | Cornelius | 277/152 |
| 5,437,707 A | 8/1995 | Cross | 75/474 |
| 5,439,504 A | 8/1995 | Czermak et al. | 75/444 |
| 5,447,551 A | 9/1995 | Huestis et al. | 75/414 |
| 5,492,309 A | 2/1996 | Meierling et al. | 266/156 |
| 5,511,795 A | 4/1996 | Laubach et al. | 277/34 |
| 5,531,424 A | 7/1996 | Whipp | 266/156 |
| 5,618,032 A | 4/1997 | Meissner et al. | 266/80 |
| 5,669,955 A | 9/1997 | Vuletic et al. | 75/381 |
| 5,685,524 A | 11/1997 | Jaffre et al. | 266/173 |
| 5,800,591 A | 9/1998 | Vallomy | 75/10.63 |
| 5,840,097 A | 11/1998 | Dam | 75/505 |
| 5,846,268 A | 12/1998 | Diehl et al. | 48/92 |
| 5,889,810 A * | 3/1999 | Katayama et al. | 373/78 |
| 5,961,690 A | 10/1999 | Kepplinger et al. | 75/446 |
| 5,993,761 A | 11/1999 | Czernichowski et al. | 423/210 |
| 5,997,608 A | 12/1999 | Diehl et al. | 75/446 |
| 5,997,609 A | 12/1999 | Diehl et al. | 75/492 |
| 6,007,742 A | 12/1999 | Czernichowski et al. | 252/372 |
| 6,015,527 A | 1/2000 | Kamei et al. | 266/145 |
| 6,027,545 A | 2/2000 | Villarreal-Trevino | 75/490 |
| 6,036,744 A | 3/2000 | Negami et al. | 75/503 |
| 6,039,916 A | 3/2000 | Celada-Gonzalez et al. | 266/82 |
| 6,045,602 A | 4/2000 | Shah et al. | 75/466 |
| 6,086,653 A | 7/2000 | Joo et al. | 75/491 |
| 6,126,717 A | 10/2000 | Gauthier et al. | 75/466 |
| 6,132,489 A | 10/2000 | Villarreal-Trevino | 75/444 |
| 6,143,053 A | 11/2000 | Reidetschläger et al. | 75/444 |
| 6,149,859 A | 11/2000 | Jahnke et al. | 266/154 |
| 6,153,852 A | 11/2000 | Blutke et al. | 219/121.59 |
| 6,183,534 B1 | 2/2001 | Kepplinger et al. | 75/436 |

* cited by examiner

INTEGRATED MINI-MILL FOR IRON AND STEEL MAKING

BACKGROUND OF THE INVENTION

1. Field of the Invention

The present invention is directed to the technology of iron and steel manufacture and, more particularly, to an integrated mini-mill based on direct reduced iron and electric arc furnace steel making.

2. Description of Related Art

Today, integrated mini-mills for iron and steel making have separate units for iron making and for steel making. Almost all produce iron separately in reduction reactor(s), cool and store the iron, and then use the iron in the steel making unit. Several methods have been developed to integrate the iron and steel making units. However, these concepts have failed to successfully and economically integrate the two systems. The present concepts are plagued by high investment and operating costs and ever rising energy costs. No system has been created which efficiently transfers the iron from the iron-making unit to the steel-making unit and efficiently utilizes energy sources.

As direct reduction reactor (DRR) diameters become larger, the present system of charging iron ore into vertical shaft DRR used by Midrex and HYL will become impracticable because of:

i) the extreme heights to which the structures must be raised, ii) poor distribution of the raw materials inside the reactor with the fine ores tending to segregate from the coarser ores and causing channeling of gases, and iii) limitations in top gas pressures.

Several methods have been developed for transporting direct reduced iron (DRI) to an electric arc furnace (EAF), for example, refractory lined containers, specially designed trucks, pneumatic transportation systems, and high temperature metallic conveyors. These methods have numerous problems, such as logistics and coordination with other parts of the mill, heavy capital investment, considerable heat loss, excessive loss of metallization, and the need for intermediate storage.

Current technologies using pressure swing adsorbers or vacuum pressure swing adsorbers (PSA/VPSA), to treat top gas from the DRR, require that the top gas be cooled and cleaned of dust before the PSA/VPSA, and the reducing gas from the PSA/VPSA be again reheated to the required reduction temperatures prior to being re-introduced into the DRR. High levels of carbon monoxide (CO) in the gas cause problems of "metal dusting" of the high temperature Ni—Cr alloy reheater tubes. This leads to frequent failures of tubes, high maintenance costs, and plant stoppages.

It is, therefore, an object of this invention to avoid the above problem and others by providing a mini-mill for steel making which integrates the iron making unit with the steel making unit. Still other objects will become apparent to those of ordinary skill in the art upon reading and understanding the following detailed description.

SUMMARY OF THE INVENTION

Accordingly, we have invented an integrated iron and steel making unit that eliminates the transportation and handling of hot DRI over long distances. The goal is to deliver the hot DRI to the EAF with a minimum loss of metallization utilizing simple and proven equipment that is easy to operate and which has a low capital investment. Additionally, the integrated iron and steel making unit leads to improved productivity in steel making; maximum operating efficiency; lower power, electrode and refractory consumptions; shorter tap-to-tap times; smaller furnaces and transformers; and overall capital cost reduction.

A method and apparatus for iron making according to the present invention includes charging a DRR with iron ore from a charging system. The iron ore is reduced to hot DRI in the DRR. At the bottom section of the DRR, at least one screw feeder discharges the hot DRI to at least one rotary kiln. The rotary kiln transports the hot DRI to at least one EAF. Slag and liquid steel are produced by and periodically tapped from the EAF in a conventional manner.

Top gas (i.e., spent reducing gas) is drawn off of a top section of the DRR. The main portion of the top gas flows to a PSA/VPSA for $CO_2$ and $H_2O$ removal. The gases exiting the PSA/VPSA are a reducing gas, comprised mostly of CO and $H_2$, and a tail gas, comprised mostly of $CO_2$ and $H_2O$ but with some useful calorific value still remaining. The tail gas from the PSA/VPSA can be used elsewhere in the plant as fuel. A small portion of the tail gas is used to pressurize the rotary kiln to prevent air from entering the rotary kiln and oxidizing the DRI.

At least one plasma torch may be used to reform natural gas, oxygen, and top gas from the DRR to form a hot reducing gas rich in CO and $H_2$. The hot reducing gas is mixed with the cool reducing gas exiting the PSA/VPSA to form a final reducing gas. The final reducing gas is delivered to the DRR at the required reduction gas temperature.

The charging system of the present invention is akin to a blast furnace charging system which thereby eliminates the need for a tall charging system, as used with current DRRs. The lower height of the present invention decreases structural costs and accessibility to the equipment.

The use of a rotary kiln to transport the hot DRI directly from the DRR to the EAF eliminates the need to cool the DRI for transport and/or storage prior to charging the EAF as well as eliminating the need to subsequently reheat the DRI for the steel making unit. Considerable savings in energy of steel making are achieved.

The use of the PSA/VPSA to remove carbon dioxide and water from the top gas from the DRR and the recycling of the gas rich in CO and $H_2$ results in the elimination of or reduction in the size of catalytic reformers over conventional catalytic reformers. Since adsorption requires no natural gas, natural gas consumption otherwise required to produce reducing gas in a catalytic reformer, is eliminated or reduced.

The use of a plasma torch generates more reducing gas and serves to preheat the gas from the PSA/VPSA. Mixing the hot and cool gases avoids the need to recycle the cool gas through a separate pre-heater or through the catalytic reformer. Problems of metal dusting of Ni—Cr tubes normally associated with gases rich in CO will thereby be avoided.

DETAILED DESCRIPTION OF THE PREFERRED EMBODIMENTS

Figure 1:
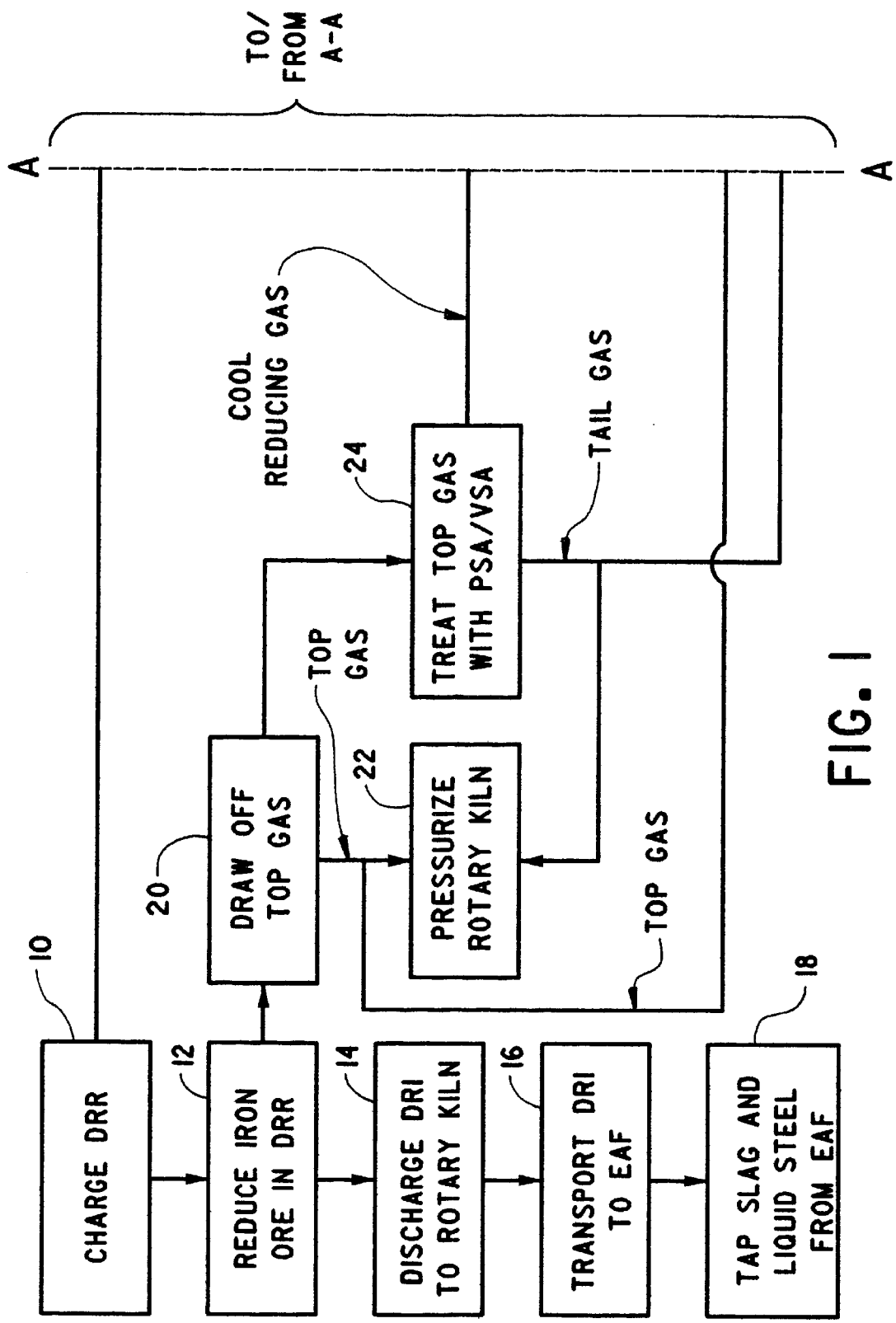
FIG. 1 is a flowchart illustration of a method for iron and steel making according to the present invention.

A complete understanding of the invention will be obtained from the following description when taken in connection with the accompanying drawing figures wherein like reference characters identify like parts throughout.

purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIG. 1, a method for iron and steel making according to the present invention includes charging a direct reduction reactor (DRR) with iron ore from a charging system in step 10. The iron ore is reduced to hot direct reduced iron (DRI) in the DRR in step 12. At the bottom section of the DRR, at least one screw feeder discharges hot DRI to at least one rotary kiln in step 14. The rotary kiln transport the hot DRI to one or more electric arc furnaces (EAF) in step 16. Each rotary kiln transports hot DRI to at least one electric arc furnace (EAF) in step 16. Slag and liquid steel are produced by and periodically tapped from each EAF in step 18.

Top gas (i.e., spent reducing gas) is drawn off of a top section of the DRR in step 20. The main portion of the top gas flows to a pressure swing adsorber or vacuum pressure swing adsorber (PSA/VPSA) for $CO_2$ and $H_2O$ removal in step 24. The gases exiting PSA/VPSA 120 are a cool reducing, gas comprised mostly of CO and $H_2$ and a tail gas comprised mostly of $CO_2$ and $H_2O$. At least one plasma torch is utilized to reform natural gas, oxygen, and the top gas drawn from the DRR in step 20 to a hot reducing gas rich in CO and $H_2$ in step 26. This hot reducing gas is mixed with the cool reducing gas exiting PSA/VPSA 120 to form a final reducing gas in step 28. The final reducing gas is delivered to the DRR in step 30.

A sub-stoichiometric burner may be utilized which reforms natural gas and oxygen to form a hot reducing gas rich in CO and $H_2$ in step 32. This hot reducing gas is mixed with the cool and hot reducing gases from PSA/VPSA 120 and the plasma torch, respectively, to form the final reducing gas in step 28.

Preferably, the plasma torch and/or the sub-stoichiometric burner eliminate the need for a catalytic converter. However, if needed to supplement the volume of hot reducing gas output by the plasma torch and/or the sub-stoichiometric burner, a small catalytic reformer may also be utilized which reforms natural gas and part of the top gas from DRR 110 in step 20 to form a hot reducing gas in step 34. A part of the tail gas exiting PSA/VPSA 120 in step 24 is utilized by the catalytic reformer for heating the hot reducing gas in step 34. This hot reducing gas supplements the reducing gases from PSA/VPSA 120, the plasma torch, and/or the sub-stoichiometric burner to form the final reducing gas in step 28.

Figure 2:
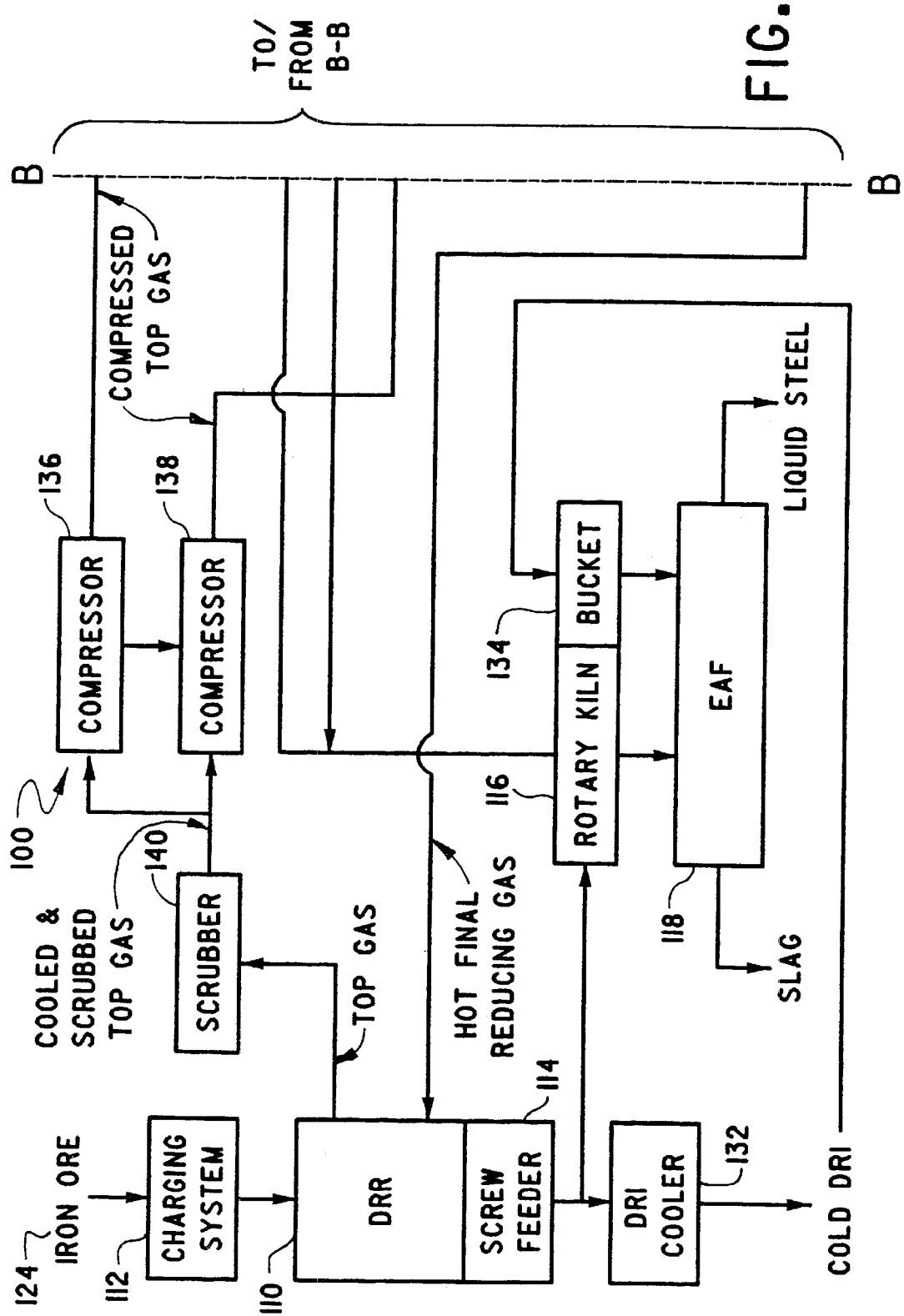
FIG. 2 is a schematic illustration of a mini-mill for iron and steel making according to the present invention.

Referring to FIG. 2, an integrated mini-mill 100 according to the present invention includes a DRR 110, a blast-furnace type charging system 112, at least one screw feeder 114, at least one rotary kiln 116, at least one EAF 118, at least one PSA/VPSA 120, and at least one plasma torch 122.

DRR 110 is a vertical-shaft reduction reactor having charging system 112 at the top of the shaft for charging DRR 110 with iron ore 124 and screw feeder 114 at the bottom of the shaft for discharging DRI from the shaft. Between an inlet of charging system 112 which received iron ore 124 and the floor of mini-mill 100, charging system 112 has a height between 40 and 50 meters. This is in contrast to a prior art charging system for a DRR, which charging system has a height between 70 and 90 meters. Preferably, charging system 112 includes a hopper and flap gates to feed the charge to DRR 110 and a rotating device and chute to uniformly distribute the charge from the hopper into DRR 110. Hot reducing gas, consisting of mostly $H_2$ and CO, is introduced to DRR 110 adjacent the bottom of the shaft. This hot reducing gas flows upward in a direction countercurrent to the flow of iron ore 124 downward through DRR 110, resulting in iron ore 124 being reduced to hot DRI. Screw feeder 114 discharges the hot DRI to rotary kiln 116.

Rotary kiln 116 transports the hot DRI 110 to EAF 118. Rotary kiln 116 is refractory lined and insulated to reduce heat loss from DRI. Since rotary kiln 116 does not process the DRI, it may be designed to be any desired length and inclination to match the distance between DRR 110 and EAF 118 and to suit the layout of integrated mini-mill 100. Rotary kiln 116 may be adjustable in rotational speed in order to vary the flow rate of hot DRI to EAF 118, for example, to slow the feed rate or stop the feed if EAF 118 is shut down. It also acts as a buffer for DRI to keep EAF 118 heat/heats in progress in the event of a stoppage in DRR 110. A low inclination of rotary kiln 116 allows DRR 110 to be installed at a lower height, which in turn reduces the structural cost of integrated mini-mill 100. Rotary kiln 116 may be designed to facilitate adding other materials, such as lime, carbon, and ferro-alloys, to the DRI for charging EAF 118.

During transport of the hot DRI from DRR 110 to EAF 118, air must be kept out of rotary kiln 116 to prevent the oxidization of iron in DRI. To this end, a seal gas is fed through rotary kiln 116 to keep it slightly positively pressurized. This positive pressure seals rotary kiln 116 to keep ambient air out. Preferably, a portion of the tail gas from PSA/VPSA 120 is utilized as the seal gas. If necessary, this tail gas may be burned with air to make the top gas received in rotary kiln 116 inert. Alternatively, the seal gas may be one or a combination of a portion of the tail gas from PSA/VPSA 120, a small portion of the top gas from DRR 110, waste gas from catalytic reformer 128, and/or nitrogen, if cheaply available.

Top gas from DRR 110 is cooled and scrubbed by a scrubber 140 and then fed to at least one compressor 136 which compresses and feeds the cooled and scrubbed top gas to PSA/VPSA 120. PSA/VPSA 120 removes $CO_2$ and $H_2O$ from the cooled and scrubbed top gas, thereby producing a cool reducing gas rich in CO and $H_2$, suitable for the reduction of the iron ore 124 and a tail gas. The cool reducing gas from PSA/VPSA 120 is mixed with hot reducing gas from plasma torch 122.

Plasma torch 122 reforms natural gas 125 with oxygen 127 or top gas from DRR 110, supplied via compressor 138, to produce a hot reducing gas rich in CO and $H_2$. Plasma torch 122 can be controlled to produce a hot reducing gas having a desired temperature. This hot reducing gas is mixed with the cool reducing gas from PSA/VPSA 120 to form a hot final reducing gas suitable for introduction to DRR 110 without additional heating. Since plasma torch 122 is relatively small, the compactness of one or more plasma torches 122 is advantageous over conventional large catalytic reformers used to produce reducing gas.

Another source for generating reducing gas is a substoichiometric burner 126. The sub-stoichiometric burner 126 reforms natural gas 125 with just enough oxygen 127 so that the natural gas is only partially burned. The product of this partial combustion is a reducing gas comprised mostly of CO and $H_2$. This reducing gas may be mixed with the cool and hot reducing gases from PSA/VPSA 120 and plasma torch 122, respectively, to form the hot final reducing gas introduced to DRR 110.

Yet another source for supplementing the reducing gas, if required, may be a conventional catalytic reformer 128 with a heat recovery system 130. Top gas from DRR 110 is compressed by compressor 138 and fed along with natural gas, after necessary preheats in the heat recovery system 130, into catalytic reformer 128. Catalytic reformer 128 uses tail gas from PSA/VPSA 120 as fuel. Catalytic reformer 128 produces a reducing gas rich in CO and $H_2$. This reducing gas is directed to DRR 110 after being mixed with the cool reducing gas output by PSA/VPSA 120, the hot reducing gas output by plasma torch 122, and/or the reducing gas output by the sub-stoichiometric burner 126.

Catalytic reformer 128 of the present invention utilizes a plurality of catalyst-filled tubes of a different cross-sectional pattern and a larger diameter, e.g., 12", or more, than those of conventional catalytic reformers. The ends of each of these tubes have a conventional configuration, but the middle portion of each tube flares out into a larger diameter circular shape. Thus, each tube has conical flanges at either end for connection to the reformer housing. The use of larger diameter tubes allows for more catalyst inside the tubes. Using more catalyst per tube results in more production with the same size catalytic reformer 128. Alternatively, the overall size of the catalytic reformer 128 may be decreased by using a larger diameter tube.

Mini-mill 100 according to the present invention also includes a DRI cooler 132. The hot DRI discharged by screw feeder 114 may be diverted to DRI cooler 132 instead of rotary kiln 116, for example, when EAF 118 is shut down. The hot DRI is then cooled in DRI cooler 132 and discharged for storage. The cooled DRI is then transported by trucks or conveyor to storage, to be later charged along with the steel scrap in buckets 134 into EAF 118.

It will be understood by those skilled in the art that while the foregoing description sets forth in detail preferred embodiments of the present invention, modifications, additions, and changes might be made thereto without departing from the spirit and scope of the invention.

We claim:

1. A method for making steel using an integrated mini-mill, comprising the steps of:

charging a direct reduction furnace with iron ore from a charging system;

reducing the iron ore into direct reduced iron in the direct reduction furnace;

discharging the direct reduced iron to a rotary kiln using a screw feeder;

delivering the direct reduced iron from the rotary kiln to an electric arc furnace that produces slag and liquid steel;

drawing the slag and liquid steel from the electric arc furnace;

drawing top gas from the direct reduction reactor; and pressurizing the rotary kiln with a portion of the top gas.

2. The method according to claim 1, further including the steps of:

treating a portion of the top gas with a pressure swing adsorber to form cool reducing gas;

creating a first hot reducing gas using a plasma torch;

combining the cool reducing gas and hot reducing gas to form a mixed reducing gas at a desired temperature; and delivering the mixed reducing gas to the direct reduction reactor desired.

3. The method according to claim 2, further including the steps of:

creating a second hot reducing gas using a sub-stoichiometric reformer; and combining the second hot reducing gas with the first hot reducing gas and the cool reducing gas to form the mixed reducing gas.

4. The method according to claim 3, further including the steps of:

creating a third hot reducing gas using a catalytic reformer; and combining the third hot reducing gas with the first hot reducing gas, the second hot reducing gas, and the cool reducing gas to form the mixed reducing gas.

5. The method according to claim 2, further including the steps of:

creating a second hot reducing gas using a catalytic reformer; and combining the second hot reducing gas with the first hot reducing gas and the cool reducing gas to form the mixed reducing gas.

6. A method for making steel using an integrated mini-mill, comprising the steps of:

charging a direct reduction furnace with iron ore from a charging system;

reducing the iron ore into direct reduced iron in the direct reduction furnace;

discharging the direct reduced iron to a rotary kiln using a screw feeder;

delivering the direct reduced iron from the rotary kiln to an electric arc furnace that produces slag and liquid steel;

drawing the slag and liquid steel from the electric arc furnace;

drawing top gas from the direct reduction reactor;

pressurizing the rotary kiln with a portion of the top gas;

treating a portion of the top gas with a pressure swing adsorber to form cool reducing gas;

creating a first hot reducing gas using a plasma torch;

combining the cool reducing gas and the first hot reducing gas to form a mixed reducing gas; and delivering the mixed reducing gas to the direct reduction reactor.

7. The method according to claim 10, further including the steps of:

creating at least one of (i) a second hot reducing gas using a substoichiometric reformer or (ii) a third hot reducing gas using a catalytic reformer; and combining the second hot reducing gas and/or the third hot reducing gas with the first hot reducing gas and the cool reducing gas to form the mixed reducing gas.

* * * * *

UNITED STATES PATENT AND TRADEMARK OFFICE
CERTIFICATE OF CORRECTION

PATENT NO.   : 6,478,841 B1
DATED        : November 12, 2002
INVENTOR(S)  : Dominic M. Faccone et al.

It is certified that error appears in the above-identified patent and that said Letters Patent is hereby corrected as shown below:

Column 3,
Line 3, "purposes of" should read -- For purposes of --.

Column 4,
Lines 66-67, "substoichiometric" should read -- sub-stoichiometric --.

Column 6,
Line 56, "according to claim 10" should read -- according to claim 6 --.
Line 59, "substoichiometric" should read -- sub-stoichiometric --.

Signed and Sealed this

Seventeenth Day of June, 2003

JAMES E. ROGAN
*Director of the United States Patent and Trademark Office*